US012676147B2

(12) United States Patent
Lee et al.

(10) Patent No.: US 12,676,147 B2
(45) Date of Patent: Jul. 7, 2026

(54) PORTABLE PERSONALIZED LARGE LANGUAGE MODELS

(71) Applicant: Zoom Video Communications, Inc., San Jose, CA (US)

(72) Inventors: Bilung Lee, Irvine, CA (US); Vijay Venkataswamy Parthasarathy, San Jose, CA (US); Renjie Tao, Santa Clara, CA (US); Zheng Yuan, Saratoga, CA (US); Bing Zhao, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 163 days.

(21) Appl. No.: 18/385,158

(22) Filed: Oct. 30, 2023

(65) Prior Publication Data

US 2025/0140245 A1 May 1, 2025

(51) Int. Cl.
| | |
|---|---|
| *G10L 15/00* | (2013.01) |
| *G10L 15/06* | (2013.01) |
| *G10L 15/183* | (2013.01) |
| *G10L 15/22* | (2006.01) |
| *G10L 15/30* | (2013.01) |

(52) U.S. Cl.
CPC .......... *G10L 15/183* (2013.01); *G10L 15/063* (2013.01); *G10L 15/22* (2013.01); *G10L 15/30* (2013.01)

(58) Field of Classification Search
CPC ...... G06F 40/30; G06F 40/211; G06F 40/253; G06F 40/268; G06F 40/284; G06F 16/90332; G10L 15/16; G10L 19/005; G10L 19/00; G10L 25/27; G10L 25/30; G10L 15/07; G10L 15/20; G10L 15/22; G10L 15/26; G10L 15/30; G10L 15/02; G10L 15/08; G10L 15/063; G10L 15/187; G10L 2015/0631; G10L 15/1822; G10L 15/183; G10L 15/193; G10L 15/19; G06N 20/00
See application file for complete search history.

(56) References Cited

U.S. PATENT DOCUMENTS

| | | | | |
|---|---|---|---|---|
| 11,176,934 | B1 * | 11/2021 | Venkatesh Raman | .. G06F 9/445 |
| 2021/0019616 | A1 * | 1/2021 | Chen | ...................... G06N 7/046 |
| 2024/0411798 | A1 | 12/2024 | Gerard et al. | |
| 2025/0078484 | A1 * | 3/2025 | Nguyen | ................... G06N 3/08 |

OTHER PUBLICATIONS

International Search Report and Written Opinion for PCT/US2024/046853 mailed Jan. 28, 2025.

(Continued)

*Primary Examiner* — Vu B Hang
(74) *Attorney, Agent, or Firm* — Kilpatrick Townsend & Stockton, LLP

(57) ABSTRACT

One example method includes transmitting, by a client device, a request for a reduced large language model ("LLM") to a remote server; receiving, by the client device from the remote server, and storing the reduced LLM, the reduced LLM based on a trained general LLM; receiving, by the client device, a request to generate content using the reduced LLM; providing the request to the reduced LLM; and receiving generated content from the reduced LLM based on the request.

20 Claims, 11 Drawing Sheets

(56)  References Cited

OTHER PUBLICATIONS

Xu et al., "Compress, Then Prompt: Improving Accuracy -Efficiency Trade-off of LLM Inference with Transferable Prompt", ARXIV.org, Cornell University Library, Ithaca, New York, May 17, 2023; pp. 1-20.

Lin et al., "AWQ: Activation-aware Weight Quantization for LLM Compression and Acceleration", ARXIV.org, Cornell University Library, Ithaca, New York, Jun. 1, 2023; pp. 1-15.

Dettmers et al. "QLoRA: Efficient Finetuning of Quantized LLMs", ARXIV.org, Cornell University Library, Ithaca, NY, May 23, 2023; pp. 1-26.

U.S. Appl. No. 18/385,141 , Non-Final Office Action, Mailed On Jul. 15, 2025, 16 pages.

Du , "Summarising Your Meeting With Chatgpt and Langchain", Medium Available Online at: https://dxiaochuan.medium.com/summarising-your-meeting-with-chatgpt-and-langchain-8eb646cfcdd, Jun. 8, 2023, 7 pages.

Du , "Summarizing your Meeting with ChatGPT and LangChain", Available online at: https://dxiaochuan.medium.com/summarising-your-meeting-with-chatgpt-and-langchain-8eb646cfcdd1, Jun. 8, 2023, 14 pages.

Li et al., "DQ-BART: Efficient Sequence-to-Sequence Model via Joint Distillation and Quantization", Available online at: https://arxiv.org/pdf/2203.11239, Mar. 21, 2022, 9 pages.

Application No. PCT/US2024/046584 , International Search Report and Written Opinion, Mailed On Jan. 17, 2025, 12 pages.

Zhang et al., "Integer or Floating Point? New Outlooks for Low-Bit Quantization on Large Language Models", Available online at: https://arxiv.org/pdf/2305.12356, May 21, 2023, pp. 1-11.

U.S. Appl. No. 18/385,141, filed Oct. 30, 2023.

* cited by examiner

600

TRANSMIT REQUEST FOR REDUCED
LLM
610

RECEIVE REDUCED LLM
620

TRAIN REDUCED LLM WITH
PERSONALIZED TRAINING DATA
630

RECEIVE REQUEST TO GENERATE
CONTENT
640

PROVIDE REQUEST TO PERSONALIZED
LLM
650

RECEIVE GENERATED CONTENT
660

PORTABLE PERSONALIZED LARGE LANGUAGE MODELS

FIELD

The present application generally relates to large language models ("LLMs") and more particularly relates to portable personalized LLMs.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
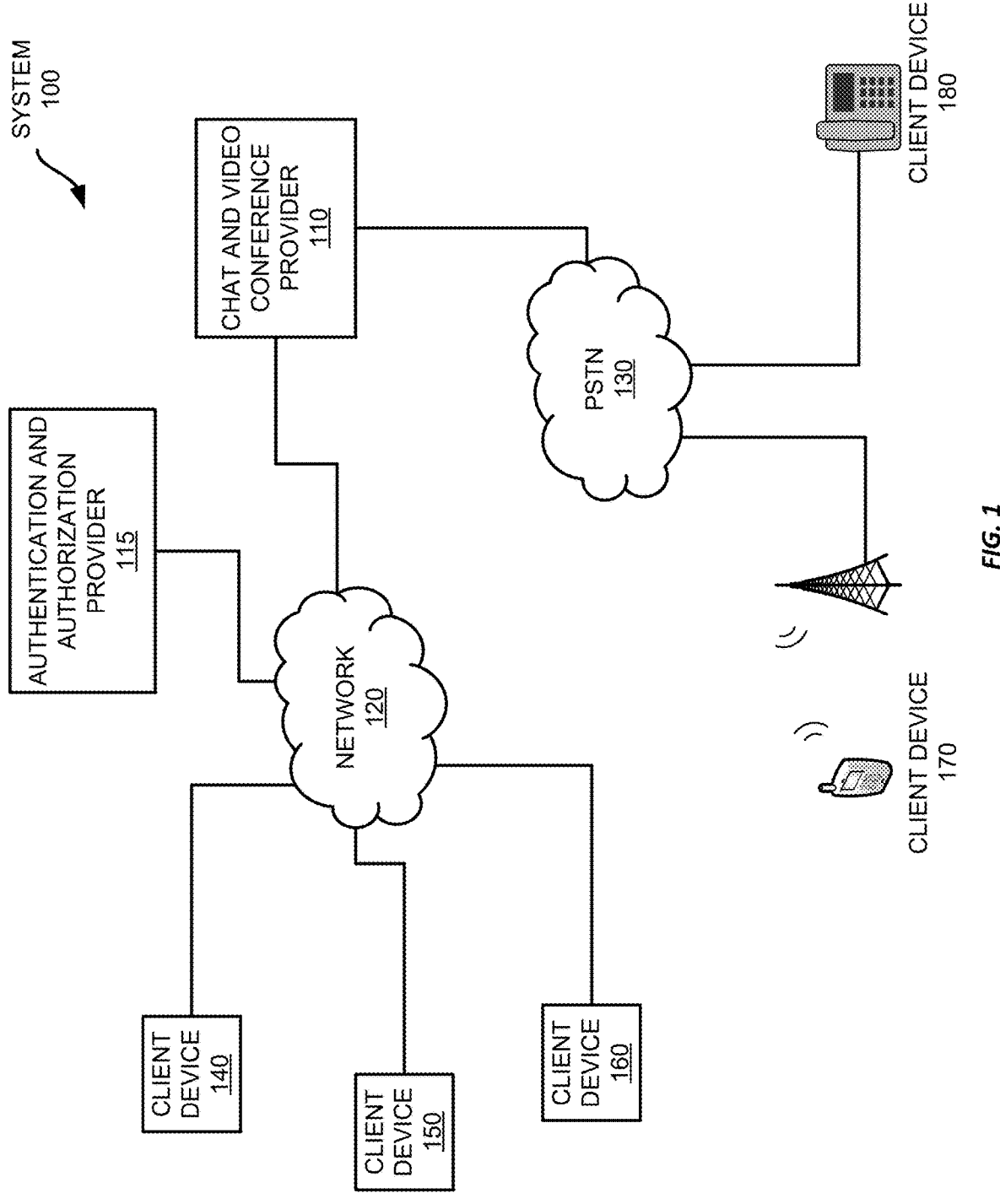
FIGS. 1-2 show example systems for portable personalized LLMs.

Examples are described herein in the context of portable personalized LLMs. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During their day, a person may perform a large number of relatively mundane tasks that may require significant time, but are relatively simple exercises. For example, in an office environment, a user may read and respond a large number of emails or generate other relatively simple communications, such as memos or presentations. In each of these cases, the user may very quickly develop their conception of what the end product should say and how it should be said; however, the mechanical process of producing the end product can take significant time, both in terms of generating a first draft but also refining the draft to a suitable end product.

While it may be possible to use a trained LLM to generate content, these models are extremely large, including many billion parameters. Further, the processing requirements for these LLMs can be massive, potentially requiring multiple processors and many gigabytes of memory to store and execute the model to respond to a request in a reasonable amount of time, e.g., a few seconds or less. Thus, LLMs are hosted on one or more servers that are available via a network connection.

Further LLMs are trained by ingesting vast quantities of content available from licensed, commercially usable datasets. As a result, an LLM may be well-trained to generate text according to a particular language; however, its output may be identifiable as having been artificially generated because it lacks a particular style or "voice." "Voice" refers to a person's manner of writing or speaking that include personal idiosyncrasies, such as cadence, pitch, diction, sentence structure, and so forth. Thus, it may be relatively obvious when a person uses an LLM to generate written content because the output lacks the person's own style, diction, cadence, or other idiosyncrasies particular to the person. To personalize the output, the person would then need to revise the output to more closely match the person's own style, or they may not care to revise and simply use the content as-is.

Thus, LLMs are not suited to use on an individual's own computing devices and are not able to generate content using the individual's own style. Instead, they are general-purpose models configured to be hosted by high performance computing devices with substantial processing and memory capabilities. Further, their outputs are broadly usable by a wide array of people because they are not trained to have a particular voice.

However, individuals may wish to be able to us artificial intelligence ("AI") functionality to generate content with their own writing style or in their own "voice." However, as noted above, a typical consumer computing device likely is not capable of hosting an LLM.

To address these problems, a LLM may be effectively reduced in size by performing an optimization process on a trained LLM to reduce the amount of memory required to store the LLM or to reduce the number of parameters within the LLM. For example, to reduce the size of the LLM, the optimization process uses a quantization process to analyze the parameters of the LLM to identify parameters that may be reduced in size. In many cases, parameters are stored as floating point numbers, such as in a 32-bit or 64-bit format. Such a representation may provide very high-precision; however, it also can consume substantially more storage than is needed to store a value. For example, parameters that have integer values, or nearly integer values (e.g., 2.001), may be more compactly stored in an 8- or 16-bit integer format. If floating point values are of importance to maintain precision, the floating-point number may be converted to a format with a lesser bit-width, e.g., by converting from a 32-bit format to a 16-bit format.

To perform this reduction, an example system may analyze each of the billions of parameters within the LLM to identify parameters with values that are within a threshold range of an integer value, e.g., within 0.1 or 0.2 of an integer, and change them to the corresponding integer and store them in an integer format. For example, any value from 2.8 to 3.2 may be converted to 3 and stored as a 16-bit integer. Similarly, the system may analyze values stored as 32- or 64-bit floating-point numbers and may convert some or all to a more compact representation, e.g., by converting 32-bit floating-point numbers to 16-bit floating-point numbers. These kinds of conversions may result in a loss of precision in the parameters (or weights) of the LLM, but it may significantly reduce the size of the LLM. For example, converting all weights from 32 bits to 16 bits may reduce the size of the LLM by 40-50%. Depending on the size of the LLM, this may be sufficient to enable the LLM to be stored and executed by a client device. These and other techniques may be employed to reduce the size of a LLM to enable it to be transferred to a consumer-grade computing device and executed. This may also enable an individual to further train the reduced LLM to generate content according to their own style or voice. Such a personalized LLM may be effectively controlled by the individual to ensure its security and their own privacy.

This illustrative example is given to introduce the reader to the general subject matter discussed herein and the disclosure is not limited to this example. The following sections describe various additional non-limiting examples and examples of portable personalized LLMs.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
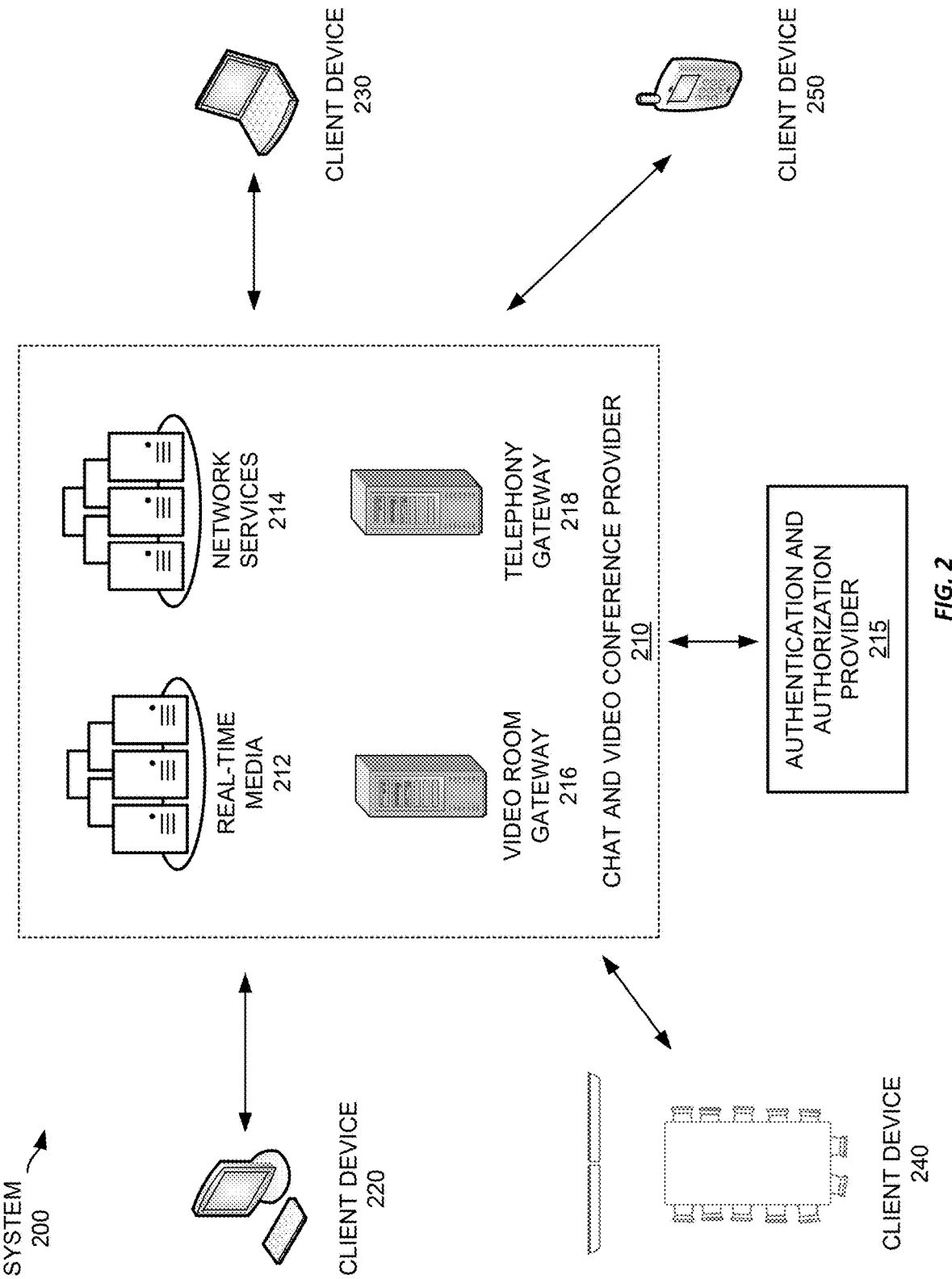

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices

220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
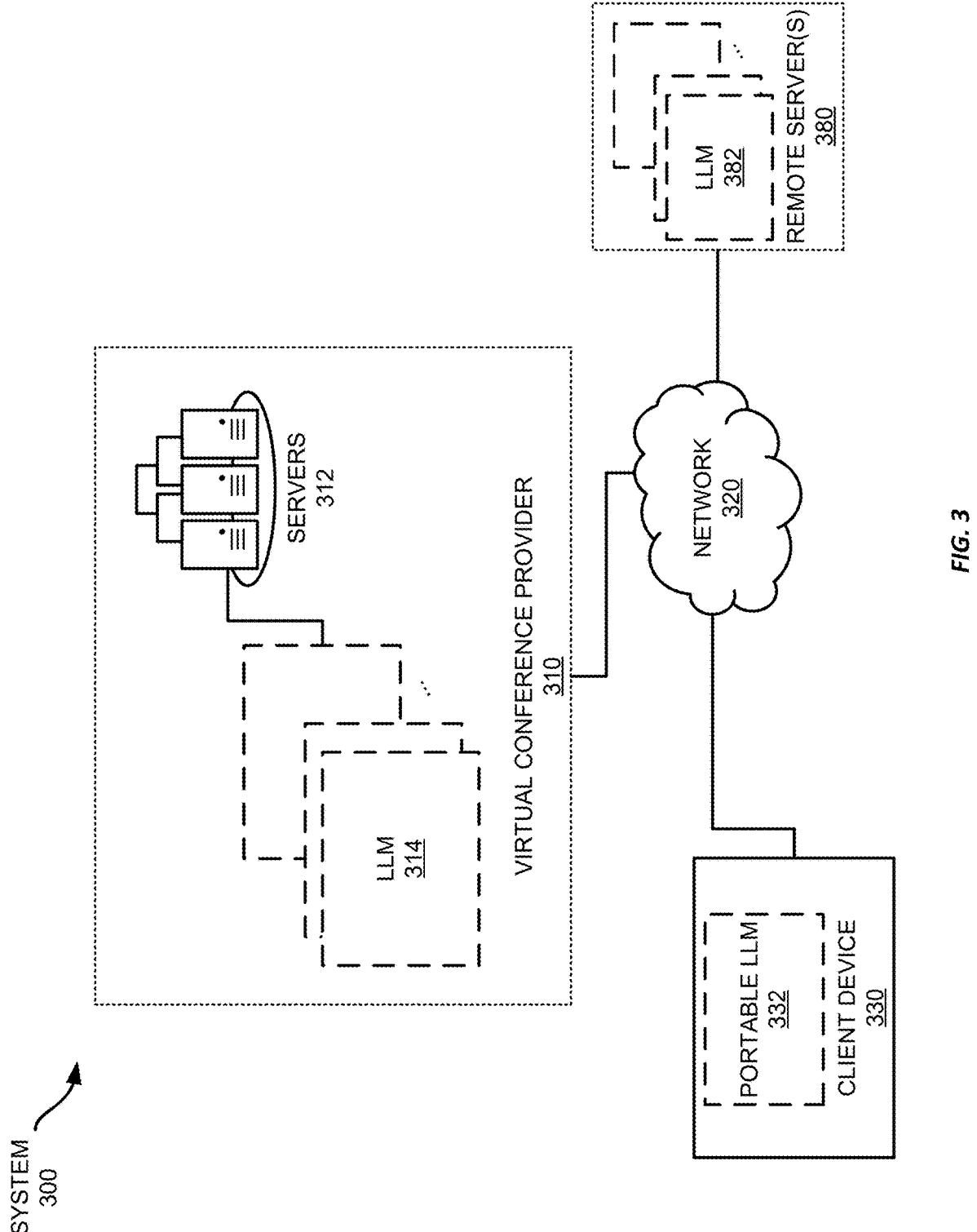
FIG. 3 shows an example system for portable personalized LLMs.

Referring now to FIG. 3, FIG. 3 shows an example system 300 for portable personalized LLMs. In this example, the system 300 includes a client device 330, a virtual conference provider 310, and one or more remote servers 380 that host one or more LLMs 382. In this example, the virtual conference provider 310 provides virtual conferencing capabilities, such as discussed above with respect to FIGS. 1-2, but also provides one or more servers 312 that provide one or more general LLMs 314 that may be used to service requests received from users via their respective client device, such as client device 330. The general LLMs 314, 382 provided by the virtual conference provider 310 or remote server(s) 380 may include one or more LLMs or one or more generative LLMs to generate images, audio, video, or other content.

The general LLM in this case is a LLM 314, which has been trained on a large corpus of data, such as information available from licensed, commercially usable, non-public datasets. For general LLMs such as LLMs, the training data may be written materials, such as webpages, documents, emails, or blogs that may be relevant to generating written works. For general LLMs trained to generate audio or video, large quantities of audio files or video files may be provided instead. However, the general LLM has not been trained to generate content in the voice or style of any particular requesting user. While general LLMs may have an understanding of styles of certain well-known authors, celebrities, or other prominent individuals, they will not be trained to generate content in a voice or style for any arbitrary member of the public. Thus, for the average user, the general LLM will not be able to generate content according to that user's style or voice, as distinguished from a personalized LLM, which has been specifically trained to generate content according to a particular user (or users).

The portable LLM 332 may be trained to emulate a particular user's writing style, though any suitable type of LLM may be used, such as one trained to generate content that emulates the user's appearance, speech, or other personal characteristics. In this case, the portable LLM 332 has been trained on the user's own documents, emails, presentations, persistent chat messages, in-meeting chat messages, contact center chats messages, whiteboard activity, whiteboard ideation content, meeting notes content, or other written content generated and shared by the user for training the portable LLM 332. For other kinds of portable LLMs, training data may include meeting audio, ambient meeting audio, phone call audio, voicemail messages, audio or video recordings, meeting recordings, or other content shared by the user, or it may be an LLM that has been trained to generate or modify images, video, or audio based on the user's own pictures or audio or video recordings. In some examples, the client device 330 may have multiple personalized LLMs to generate different types of personalized content.

For example, a client device 330 may have a personalized portable LLM 332 to generate personalized text content, a second personalized LLM to generate personalized audio content, a third personalized LLM to generate personalized images, and a further personalized LLM to generate personalized video content. Similarly, a client device 330 may have any combination of such models or any other suitable personalized LLM(s). It should be appreciated that while the example system 300 shows the personalized LLM 332 being resident on the client device 330, in some examples, one or more personalized LLMs may be hosted by other computing devices, such as a remote server or the virtual conference provider 310. In such examples the personalized LLMs may be accessible only through an authentication process, such as involving a username and password, two-factor authentication, or similar sorts of access controls to ensure that only the user has access to the personalized LLM.

To obtain generated content from a general LLM 314, 382, a user of the client device 330 may interact with client software by typing in or speaking a description of the content to be generated by the general LLM 314, 382. The user may also indicate the type of content to be generated, such as text, an email, an agenda, a presentation deck, an audio message, a video, or audio-visual content. General LLMs 314, 382 may allow the user the user to include both a description of the desired content to be generated, but also certain constraints, such as the length of the content, specialized vocabulary that may be used, or a level of formality of the content (e.g., casual or professional). After submitting the request (or prompt) to the general LLM 314, 382, the general LLM 314, 382 will generate a response and provide it to the client software, which can then display it for the user. However, because the general LLM is not trained to generate content in the user's own voice or style, the user may need to spend time revising the generated content so that it suits their own needs.

To help address this issue, a user could submit their own writings and other materials (such as those discussed above) to the general LLM 314, 382 to train it to generate content in the user's voice or style. However, this could involve a loss of privacy and allow others to generate content in the user's style or voice, which the user may not wish to allow. Instead, the user may want to obtain their own personal LLM that they can control, train, and use as they wish, without sharing it with other users. For example, the user could keep their personal LLM on a personal laptop or smartphone, or could keep it installed on their own private server in at a cloud provider. They could then use various access controls to ensure that they have control over who is able to use that personal LLM.

However, a general LLM 314, 382 can have many billions of parameters, requiring more memory and processing resources than is available in a typical consumer computing device 330. Thus, it is not feasible for a user to obtain and install a general LLM 314, 382 on their own computing devices. Instead, the user can obtain a reduced-sized or portable LLM 332 that is based on a larger general LLM 314, 382 that they can then install on their own client device 330 and train to use the user's style or voice.

Figure 4:
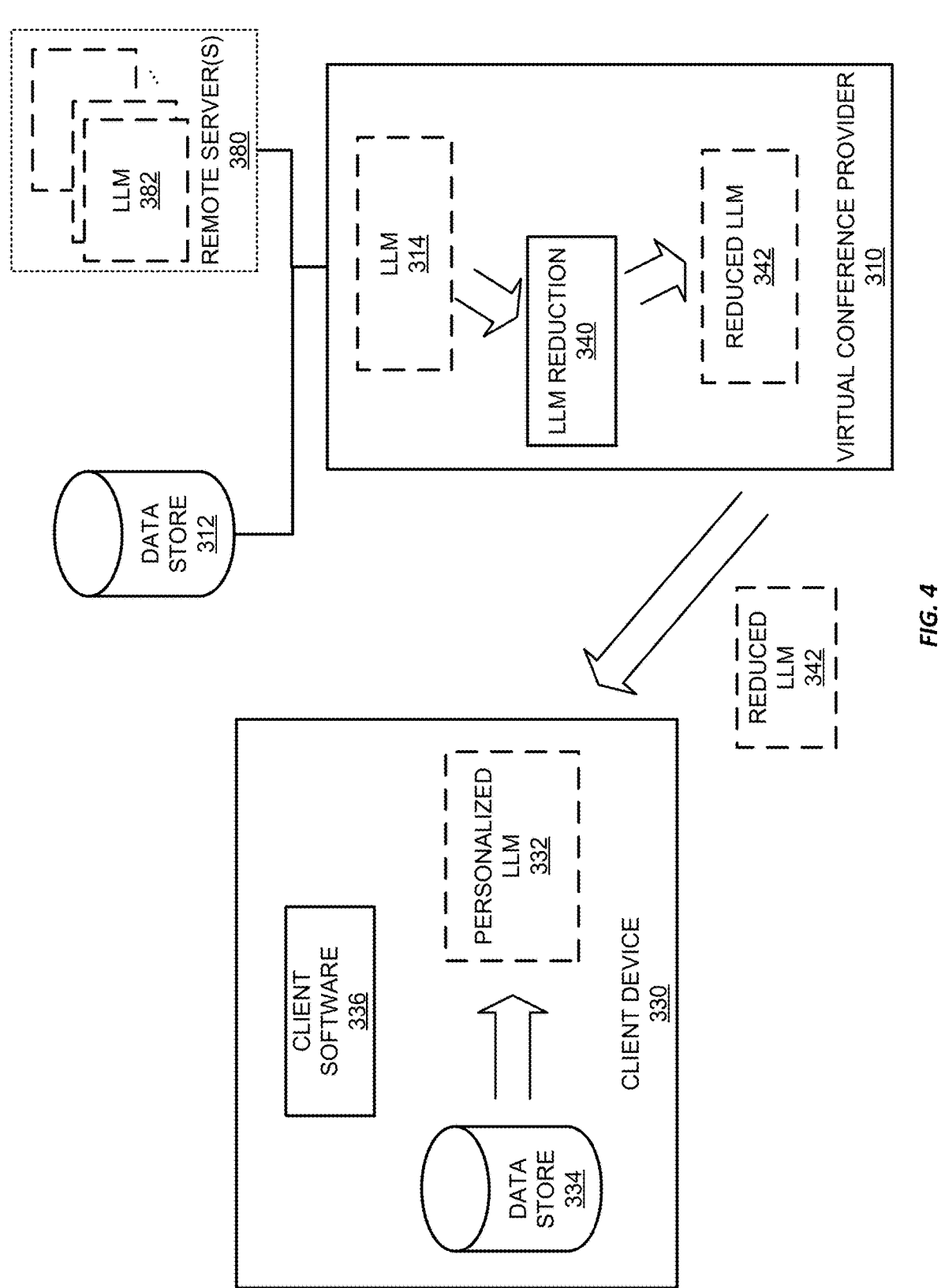
FIG. 4 shows an example system for portable personalized LLMs.

Referring now to FIG. 4, FIG. 4 illustrates an example system for portable personalized LLMs. In the example system, the virtual conference provider 310 has access to different LLMs, one that the virtual conference provider 310 itself maintains as well as LLMs 382 provided by remote servers, such as from a third-party. The LLMs 314, 382 may be used by users of the virtual conference provider 310 to generate content of interest for the users. However, as discussed above, it may be desirable for a user to have access to their own personalized LLM. Thus, the virtual conference provider 310 includes LLM reduction functionality 340 to reduce the size of an LLM, such as the virtual conference provider's own LLM 314 or those available from remote servers 380.

To generate a reduced LLM 342, the virtual conference provider 310 accesses a trained LLM 314, 382 and provides access to the LLM reduction functionality 340. The LLM reduction functionality 340 generates a reduced LLM 342, which may then be obtained by one or more client devices, e.g., client device 330. The LLM reduction functionality 340 may reduce the size of an LLM 314, 382 using different techniques or combinations of techniques. For example, the LLM reduction functionality 340 may employ quantization techniques to adjust within the LLM 314, 382, or it may employ distillation techniques to reduce the number of weights within the LLM 314, 382. Some examples may employ a combination of these techniques.

In this example, the LLM reduction functionality 340 employs quantization techniques to reduce the storage requirement for the large number of weights that are maintained as part of the LLM 314, 382. As discussed above, an LLM 314, 382 may have many billions of parameters having corresponding weights. Thus, by reducing the storage requirements for the weights, the amount of memory needed to store and execute the LLM 314, 382 may be reduced. However, this may result in a loss of some precision in the resulting reduced LLM 342, though the loss of precision may still be acceptable.

To reduce the storage requirement for the weights, the LLM reduction functionality 340 performs quantization on the weights within the LLM. In this example, the LLM reduction functionality 340 quantizes the weights by reducing the precision of the weights by changing the numerical representation of the weights. For example, the LLM 314 may be configured to use 32-bit or 64-bit floating-point representations for weights. These representations provide fine precision, but at the expense of increased storage needs. Smaller representations of floating-point numbers may be used instead, which may result in a loss of precision, but at a reduced storage cost. For example, quantization may convert 32-bit floating-point numbers to 16-bit floating-point numbers, effectively halving the amount of memory required to store the LLM's weights. In some cases, this may effectively reduce the precision of the value for one or more weights because a 16-bit floating-point representation cannot store as many different values as a 32-bit floating-point representation. Thus, a portion of the weight's value may be truncated, rounded, or otherwise changed by the conversion. This may manifest in less accurate or robust content generation by the model. However, the cumulative loss of precision may not be sizeable enough to materially affect the quality of output from LLM. Thus, the LLM 314 may be reduced in size without significantly degrading its performance.

And while this example employed a change between two different representations for floating-point numbers, other numerical formats may be used instead. For example, floating-point values may be rounded to an integer value, if the floating-point value is sufficiently close to an integer value. For example, if the floating-point value for a weight is 3.078234 . . . , it could be rounded to exactly 3 and stored as an integer. Using such a representation, substantially less storage space may be required. Thus, a 32-bit or 64-bit floating-point value could be stored as a 16-bit (or smaller) integer.

Alternatively, it may not be desirable to round every weight in such a fashion because of the potential for significant loss of precision. For example, a weight of 1.492654 . . . may round to 1, this would involve a substantial loss of precision—on the order of 33% in this case. Thus, quantization may employ one or more thresholds to determine whether to round a weight to an integer value or to convert to a lower-precision floating-point value. For example, a threshold distance from an integer value maybe employed, e.g., 0.2. Thus, for a value of 3.19, quantization may round the value to 3, while for a value of 3.21, quantization may not round and may instead convert the value from a 32-bit (or other) floating-point representation to a less-precise representation, e.g., a 16-bit representation. In some cases, a threshold may be a percentage loss of precision due to rounding, e.g., 10%. Thus, a weight value of 3.28 may round to 3, while a weight value of 3.32 may not be rounded and may instead be converted to a less-precise floating point representation.

In another approach, which may be used instead of (or in addition to) converting to another floating-point or integer representation, quantization may analyze the weights in the LLM 314 and determine whether a smaller fixed-point representation may be employed without losing a substantial amount of precision. Because a fixed point representation involves a fixed number of bits for an integer portion and a fixed number of bits for the decimal portion, quantization may determine the maximum or minimum weights within the LLM and determine whether a reduced-size fixed-point representation may provide memory savings with less loss of precision. For example, a 16-bit fixed-point representation may allow for 12 integer bits and 4 decimal bits, meaning a maximum integer value of $2^{11}$ for signed numbers or $2^{12}$ for unsigned numbers. If no floating-point weights exceed either of these values, then such a representation may be used, while allowing some of the decimal portion to be retained, thereby lessening a loss of precision that may occur by converting to an integer representation. Using such a technique, 32-bit (or larger) floating-point values may be stored as 16-bit fixed-point values.

Using these techniques, it may be possible to significantly reduce the amount of memory required to store the LLM 314, thereby generating a reduced LLM 342.

In addition to, or instead of, changing a representation of one or more weights, the LLM reduction functionality 340 may instead use a distillation process to "distill" the LLM 314, 382 into an LLM having fewer weights. Any suitable distillation process may be employed. For example, one distillation process involves the LLM reduction functionality obtaining access to a copy of an untrained LLM that has fewer weights than the LLM 314, 382. For example, the LLM reduction functionality may access an LLM with half as many weights (or fewer than half as many weights) as the LLM 314, 382. It may then use a teacher-student process to train the smaller LLM based on a set of inputs supplied to the LLM 314, 382 and the outputs generated by the LLM 314, 382. Thus, the smaller LLM may be trained to mimic the processing performed by the LLM 314, 382. While the smaller number of weights may mean that the smaller LLM is not able to exactly replicate the results generated by the LLM 314, 382, the training process may enable the smaller LLM to generate results that are sufficiently similar to those generated by the LLM 314, 382.

In some cases, the LLM reduction functionality 340 may train the smaller LLM on a particular type of input and output, such as requests to generate email correspondence, requests to generate presentations, or requests to generate memoranda. By limiting the scope of outputs to be generated by the smaller LLM, its ability to replicate the content generated by the LLM 314 may be further improved in a particular domain. While it may still be able to generate outputs of other types, e.g., a smaller LLM trained to generate emails and memoranda may be able to generate presentations, the output quality of the presentations may be significantly less than the output quality of emails and memoranda. Thus, the smaller LLM, once trained, may be stored as a reduced LLM 342. By training multiple different types of reduced LLMs 342 in such a fashion, a user may be able to access a particular type of reduced LLM 342 for the type of content they are working with.

After training the smaller LLM, it may be possible to further reduce its size by performing the quantization process discussed above to change the representation of weights within the smaller LLM, thereby generating an even more compact LLM. As discussed above, this may result in some reduced precision, but still may provide good quality generated content. Thus, by using distillation, quantization, or a combination of the two, the size of an LLM 314, 382 may be reduced to generate a reduced LLM 342, while retaining reasonably accurate performance with respect to the original LLM 314, 382. Such a reduced LLM 342 may then be provided to one or more client devices 330 to be used locally.

To obtain a reduced LLM, a client device 330 may connect to the virtual conference provider 310 and request a copy of the reduced LLM 342, which may be downloaded to the client device 330. After receiving the reduced LLM 342, a user of the client device may access client software 336 to interact with the reduced LLM 342 to generate content, or the user may opt to train the reduced LLM 342 on the user's own content to personalize the reduced LLM 342, thereby generating a personalized LLM 332.

To generate the personalized LLM 332, the client software 336 may access the data store 334 to obtain documents, emails, presentations, or other content that was generated by the user. This content may then be used as training data for the reduced LLM 342. The user may continue to provide their own content to the reduced LLM 342 until the output of the reduced LLM 342 is sufficiently similar to the user's own style or voice. The user may then end the training process and make use of the personalized LLM 332 to generate content as desired. Further, to enhance privacy and safety, as well as provide other benefits, the system may be prevented from using client information or personal information (e.g., customer audio, video, chat, screen-sharing, attachments, or other communications-like customer content (such as poll results, whiteboards, or reactions)) to train any general AI models and instead only use the personal information for inferencing of the general AI/ML processing system as directed by the client or user. Instead of using the user's personal information to train general AI/ML models, general AI/ML model training may be performed using one or more commercially licensed data sets that do not contain the personal information of the user, client, or organization Referring to FIGS. 5A-5D, FIG. 5A shows an example graphical user interface ("GUI") 500 for a client software 336 according to certain examples. The GUI 500 may be displayed on a client device 330 in response to information sent by a chat and video conference provider, such as the chat and video conference provider 110 in FIG. 1. The GUI 500 may be generated by client software 336, e.g., a stand-alone chat client or integrated into a video conferencing application, run by one or more processors stored on the client device. The client device 330 may be a personal computer such as a desktop or laptop, a mobile device, or other computing device having at least a processor, non-transitory memory, a user input system, and communication interface, providing network connectivity.

Figure 5A:
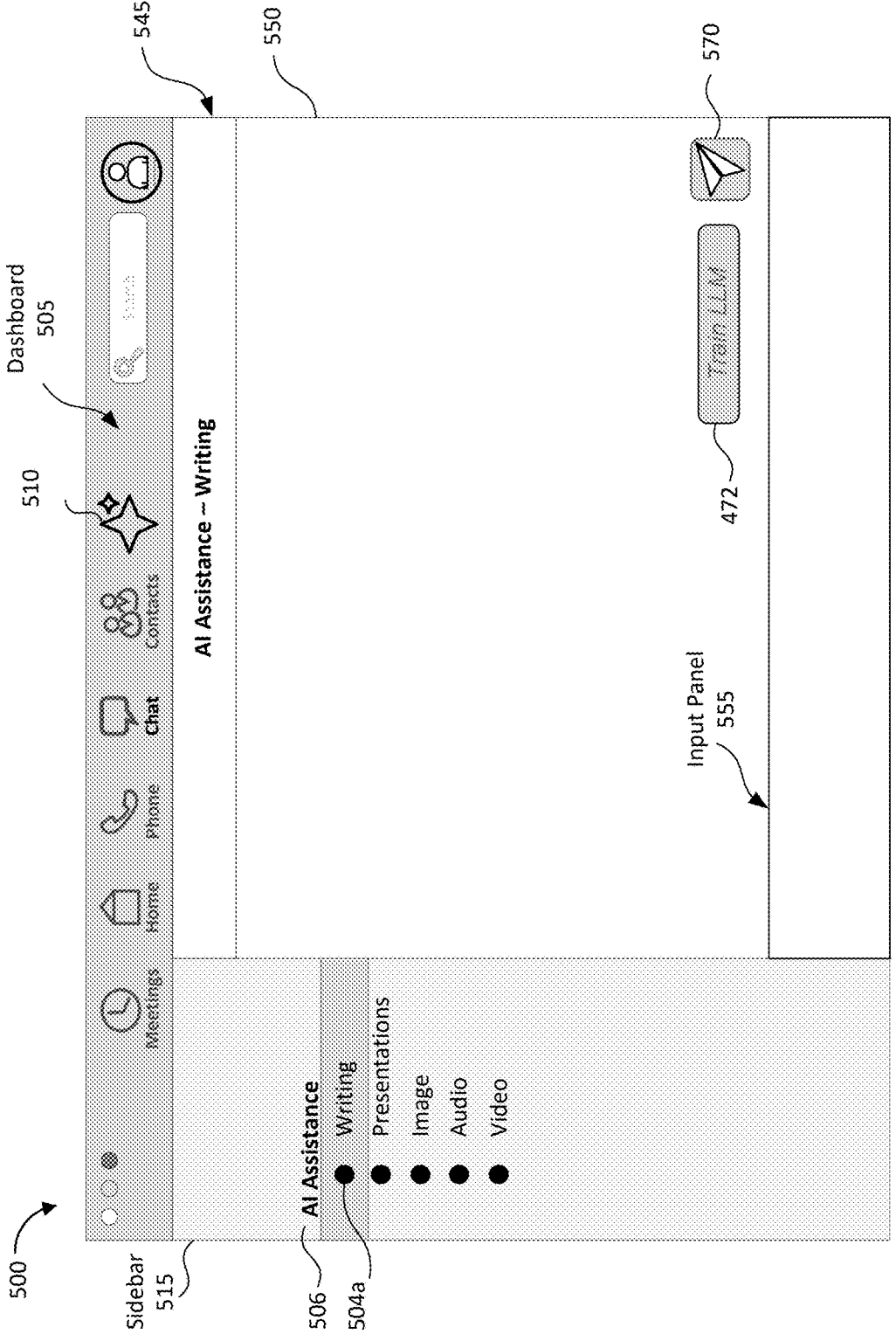
FIGS. 5A-5D show example graphical user interfaces for an example system for portable personalized LLMs.

The GUI 500 may include a dashboard 505, a sidebar 515, an AI assistance window 550, and a reply panel 555. The dashboard 505 may include one or more buttons or links that switch functionalities and/or views of the GUI 500. For example, FIG. 5A shows an AI assistance view, perhaps in response to a user command selecting an AI assistance button 510 in the dashboard 505. In this view, the AI assistance window 550, the reply panel 555, and other components illustrated in FIG. 5A may be displayed on the client device 330. In other examples, a contacts button may be selected by a user. In response to the contacts button being selected, the AI assistance window 550 and the reply panel 555 may be replaced by a display of a contacts window including a list of user contacts associated with the user of the client device. The sidebar 515 may be displayed alongside the contacts window. Other configurations are also possible. Various buttons on the dashboard 505 may correspond to various displays of windows being displayed on the client device 330.

The sidebar 515 in this example includes options for AI assistance 506, which are reflected in the heading 545 of the AI assistance window 550. In this example, the user has selected an option 504*a* for AI assistance with writing content; however, other options, including presentations, images, audio, and video are provided. And while this example includes these particular options, any suitable options may be included for the user to select from. Alternatively, the user may identify a type of AI assistance by entering one or more prompts into the input panel 555 to interact with the AI assistance functionality via the reply panel 555.

The reply panel 555 may include an input field, where the user may cause the client device to send a message to an LLM 314, 332, 342, 382. The input field may be accessed by a peripheral device such as a mouse, a keyboard, a stylus, or any other suitable input method. In some examples, the input field may be accessed by a touchscreen or other system built into the client device. In some examples, a notification may be sent from the client device and/or the video conference provider that indicates a response is being entered into the input field by the user. In other examples, no notification may be sent.

The GUI 500 may include a send button 570, which may, in response to a user command, cause the client device to send the contents of the input field (or "prompt") for AI assistance. In this example, the prompt may be sent to the reduced LLM 342, if the user has not trained it, to the personalized LLM 332, if the user has trained the reduced LLM 342, or to one of the remote LLMs 342, 382 by the client software 336. In addition, the GUI 500 may include a "Train" button to allow the user to supply training data and further train the reduced LLM 342 or the personalized LLM 332. Training data may be obtained from the user's own data store of documents, presentations, emails, and so forth and may be selected after the user selects the "Train" 572 option.

Figure 5B:
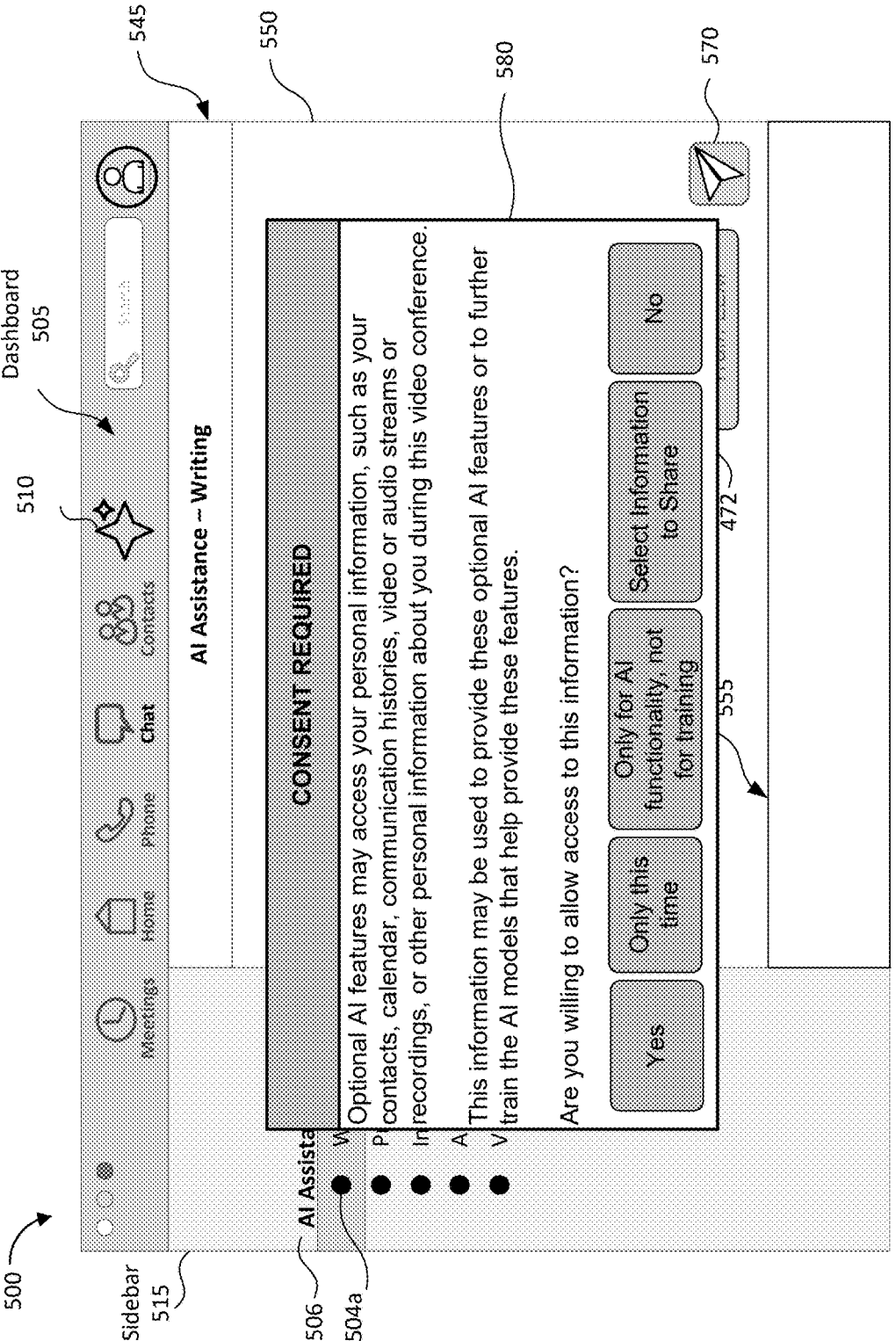

Referring now to FIG. 5B, FIG. 5B illustrates another view of the GUI 500 shown in FIG. 5A. In some examples according to the present disclosure, a user may select an option to use one or more optional AI features available from the virtual conference provider 310, such as by selecting the AI assistance button 510. The use of these optional AI features may involve providing the user's personal information to the LLMs 314, 332, 342, 382 underlying these AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying LLMs 314, 332, 342, 382.

Before capturing and using any such information, whether to provide optional AI features or to providing training data for the underlying LLMs 314, 332, 342, 382, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any LLM 314, 332, 342, 382. Additionally, these optional AI features are turned off by default—account owners and administrators control whether to enable these AI features for their accounts, and if enabled, individual users may determine whether to provide consent to use their personal information.

Further, to enhance privacy and safety, as well as provide other benefits, the system may be prevented from using personal information (e.g., customer audio, video, chat, screen-sharing, attachments, or other communications-like customer content (such as poll results, whiteboards, or reactions)) to train any LLMs and instead only use the personal information for inferencing of the AI/ML processing system. Instead of using the user's personal information to train AI/ML models, AI/ML model training may be performed using one or more publicly available, commercially-usable data sets that do not contain the personal information of the user or organization.

As can be seen in FIG. 5B, a user has selected an option to use an available optional AI feature, i.e., the AI assistance button 510. In response, the GUI 500 has displayed a consent authorization window 580 for the user to interact with overlaid on the GUI discussed above with respect to FIG. 5A. The consent authorization window 580 informs the user that their request may involve the optional AI feature accessing multiple different types of information, which may be personal to the user. The user can then decide whether to grant permission or not to the optional AI feature generally, or only in a limited capacity. For example, the user may select an option to only allow the AI feature to use the personal information to provide the AI functionality, but not for training of the underlying LLMs 314, 332, 342, 382. In addition, the user is presented with the option to select which types of information may be shared and for what purpose, such as to provide the AI functionality or to allow use for training underlying LLMs 314, 332, 342, 382.

Figure 5C:
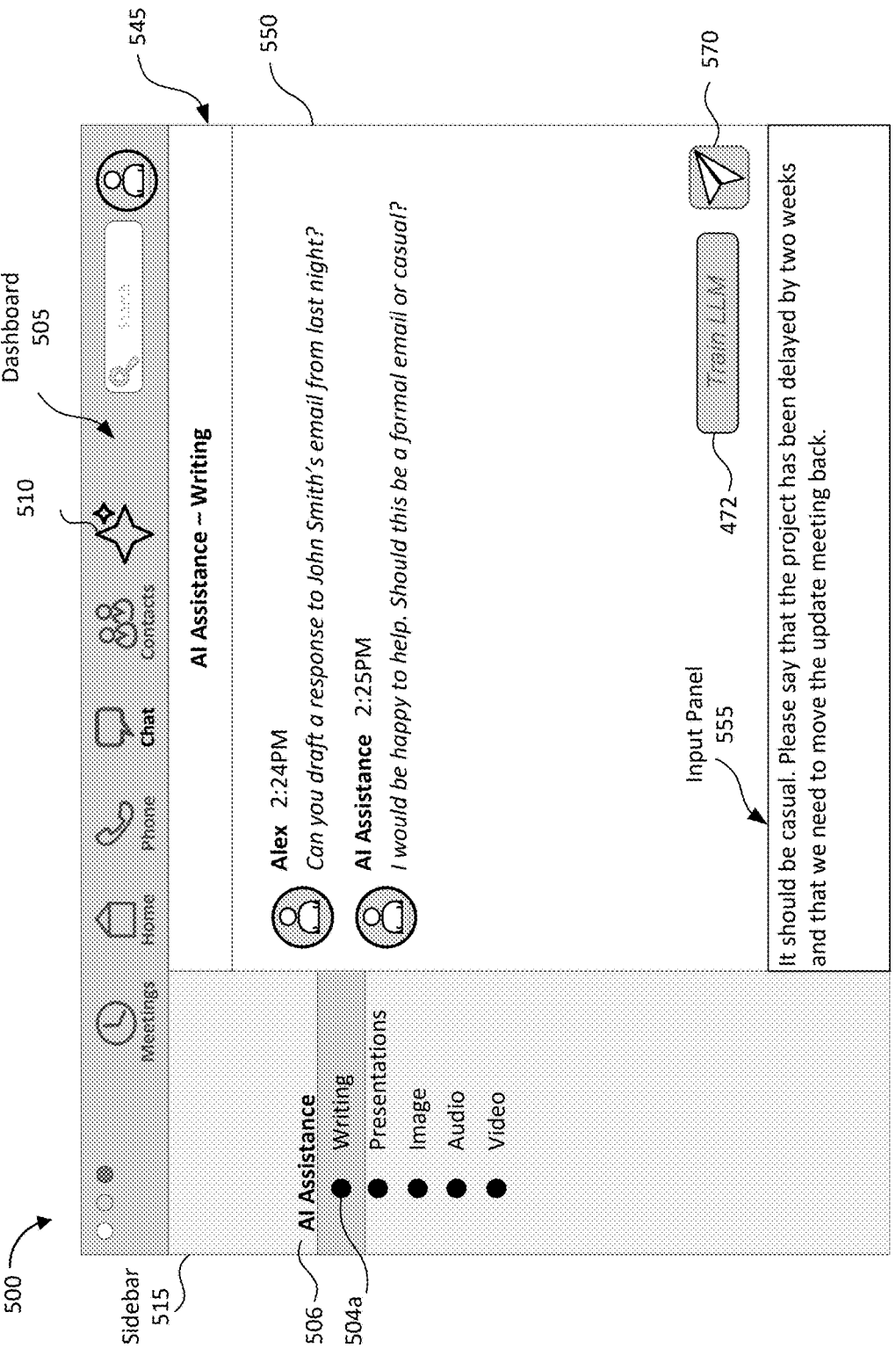

Referring to FIG. 5C, the user has entered a prompt to draft a response to a colleague's email, to which the AI assistance has responded with a follow-up question. In this example, the client software 336 provided the prompt to the personalized LLM 332, which has responded with the request for additional information. To do so, it has accessed the user's email history and identified the appropriate email from John Smith. For other types of requests, the personalized LLM 332 may be provided with access to other of the user's data stores, upon the user granting appropriate permissions, such as chat channels, email, or video conference transcripts. Using such information, the personalized LLM 332 may be able to identify relevant information to generate the requested content. As discussed above, the user may select an option to allow the personalized LLM 332 to receive personal information to generate requested content, but prevent the personalized LLM 332 from using the personal information for training. Such an option may force the personalized LLM to delete the personal information after the request has been processed and may prevent any training functionality from being executed.

In this case, the user has begun drafting a second prompt that responds with the additional information and also includes some information to provide. Thus, the client software 336 enables the user to provide information to the personalized LLM 332 to generate the requested content, including over the course of multiple prompts.

Figure 5D:
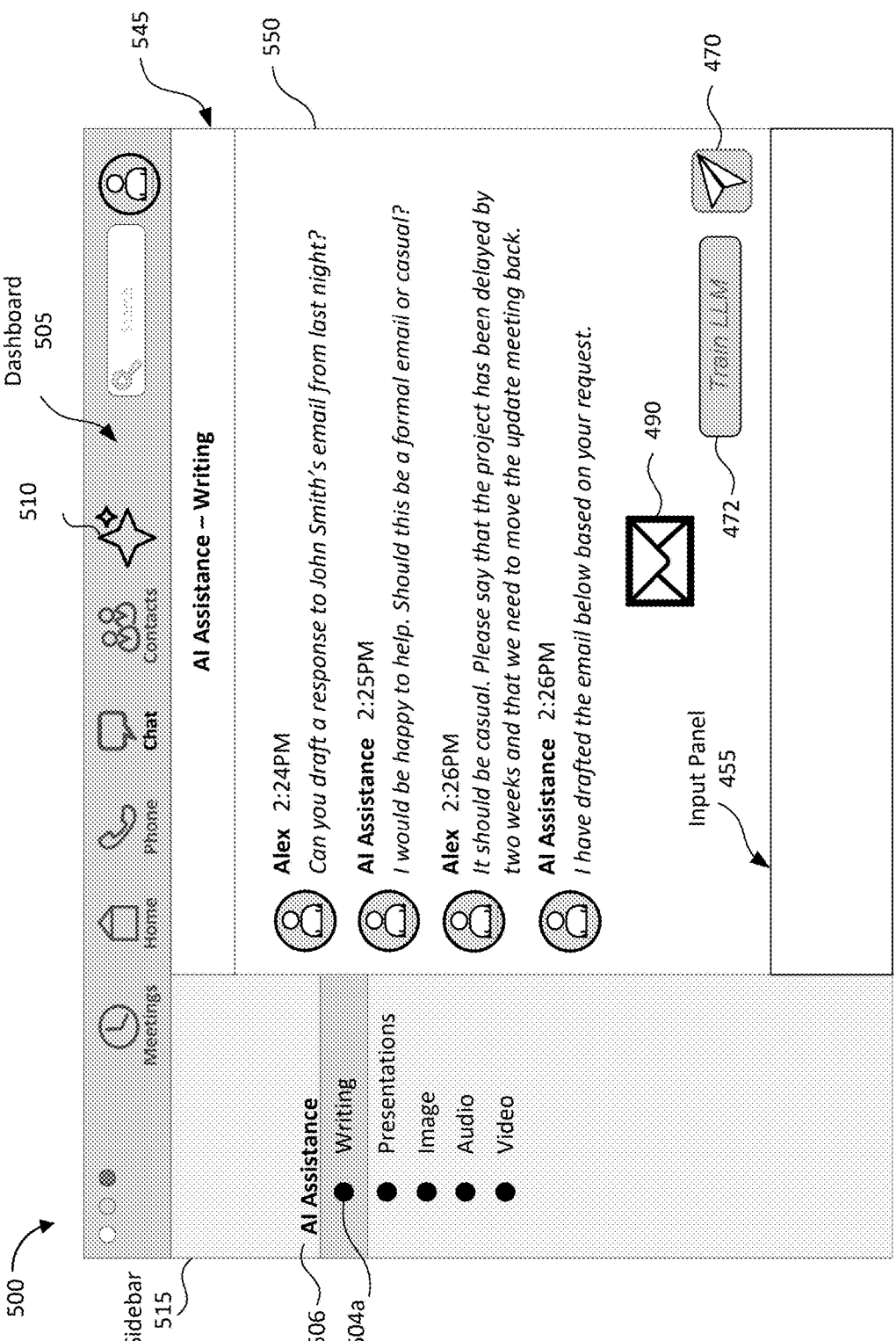

FIG. 5D illustrates the GUI 500 after the personalized LLM 332 has created a draft email 590 based on the prompts provided by the user. In this case, the email is represented by an email file, e.g., a .msg file, that was generated by the personalized LLM 332. Thus, the user can view the email by selecting it within the GUI 500 to open it. In this case, because the personalized LLM 332 was used to generate the draft email, it has been drafted in the user's own style and voice. However, it should be appreciated that the user may instead select an option to send the request to a general LLM 314, 382 to generate content instead.

Figure 6:
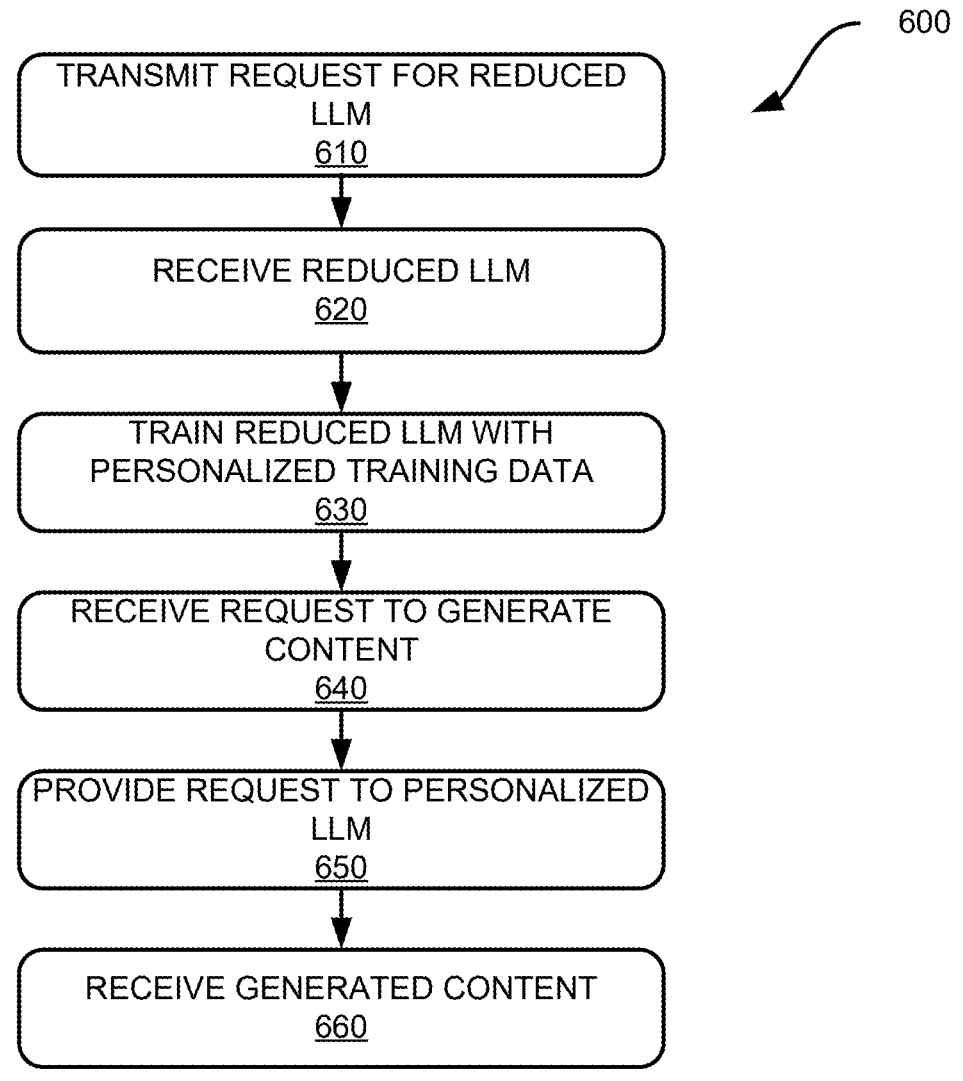
FIGS. 6-7 show example methods for portable personalized LLMs.

Referring now to FIG. 6, FIG. 6 shows an example method for portable personalized LLMs. The example method will be described with respect to the system shown in FIGS. 3-4; however, it should be appreciated that any suitable system according to this disclosure may be employed.

At block 610, a client device 330 transmits a request to a remote server for a reduced LLM 342. In this example, the client device 330 transmits the request to the virtual conference provider, however, any remote server that can provide a reduced LLM 342 may be used.

At block 620, the client device receives and stores the reduced LLM, such as in a non-volatile memory.

At block 630, the client device trains the reduced LLM 342 to generate a personalized LLM 332. In this example, the client device 330 receives a request to train the reduced LLM 342 based on the user selecting the "Train" 572 option. In this example, the user selects an option to train the reduced LLM in a GUI 500. The client device then receives an identification of one or more user-generated content items. In this example, the user identifies one or more storage locations for user-generated content items, such as documents, presentations, emails, recorded audio or video, images, or any other type of user-generated content. The storage locations may be identified at any suitable location, such as on the client device 330, at one or more remote servers, or within a document management system. The client device 330 then trains the reduced LLM 342 based on the one or more user-generated content items to generate a personalized LLM 332.

At block 640, the client device 330 receives a request to generate content. For example, as discussed above with respect to FIG. 5C, the user may enter a prompt into GUI 500 to provide a request to the personalized LLM 332 to generate content. The prompt may provide one or more instructions regarding the type of content to generate, what the content should address, and any constraints for the personalized LLM 332 to employ when generating the content. In some examples, the user may use speech input to the client software 336, which may employ automatic speech recognition to generate a textual representation of the speech, which may then be provided as a prompt to the personalized LLM.

At block 650, the request is provided to the personalized LLM 332. In this example, the personalized LLM 332 is resident on the user's client device 330. However, in some examples, the personalized LLM 332 may be stored on a remote server and may require user authorization to access. For example, the user may need to enter a username and password, as well as additional information such as two-factor authentication, to access the personalized LLM 332. Such techniques may also be employed even when the personalized LLM 332 is stored on the user's own client device 332.

At block 660, the client device receives the generated content from the personalized LLM 332 and provides it to the user.

While this example has been described as having a particular set of blocks and a particular ordering, it should be appreciated that one or more blocks may be omitted or performed in a different order. For example, the method 600 indicates that the reduced LLM 342 is trained to generate a personalized LLM 332. However, the reduced LLM 342 may be used without additional training. In such cases the reduced LLM 342 may generate requested content, but because it has not been trained on the user's own user-generated content, it may not generate content in the user's voice or style. The user may at some later time train the reduced LLM 342, thus, they may elect to omit the training functionality 630 until that later time.

Figure 7:
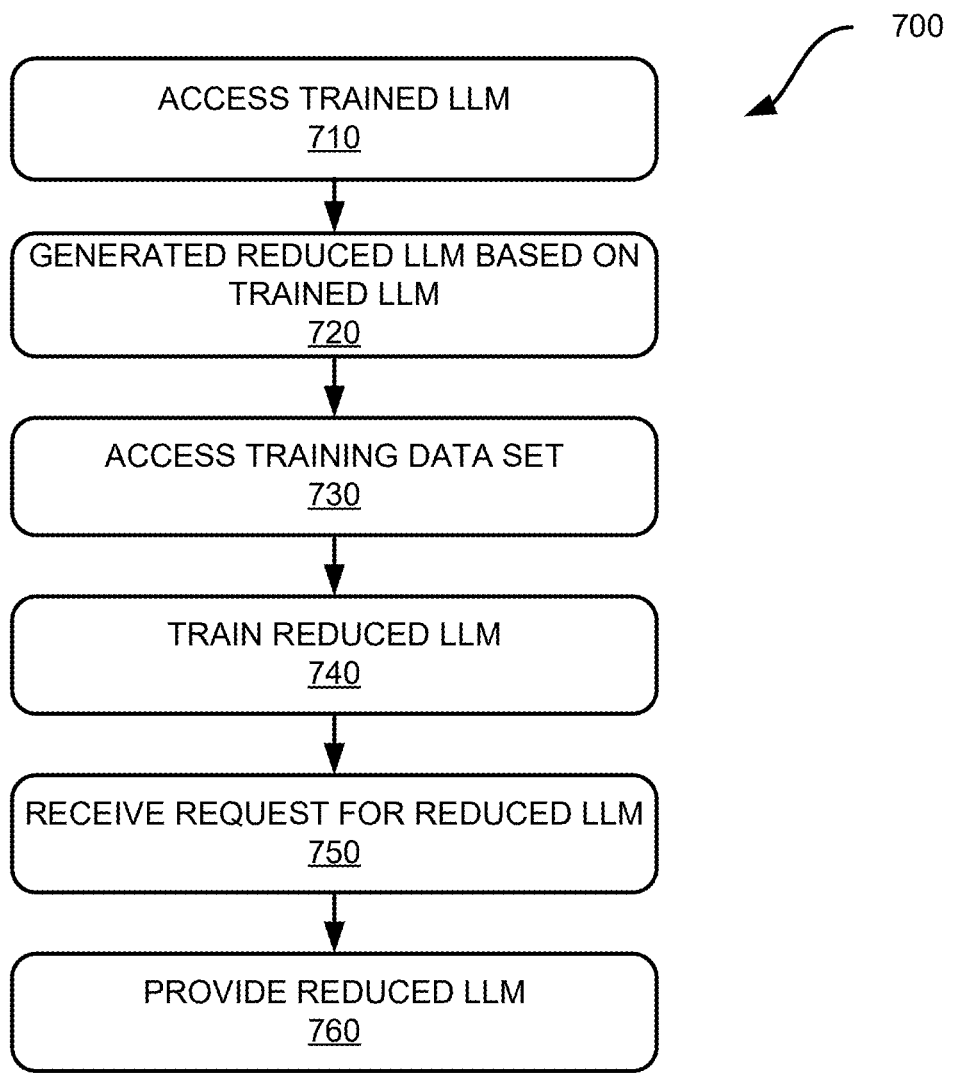

Referring now to FIG. 7, FIG. 7 illustrates an example method 700 for portable personalized LLMs. The example method 700 will be described with respect to the system shown in FIGS. 3-4; however, it should be appreciated that any suitable system according to this disclosure may be employed.

At block 710, the virtual conference provider 310 accesses a trained LLM 314, 382 that has a first set of parameters. The trained LLM 314, 382 may be any suitable LLM that has been trained to generate content, such as written content, audio content, images, video content, and so forth, and may be hosted by the virtual conference provider 310 itself or at one or more remote servers 380.

At block 720, the virtual conference provider 310 generates a reduced LLM 342 that has a second set of parameters that is smaller than the first set of parameters for the trained LLM 314, 382. The second set of parameters may be smaller than the first set of parameters because the second set has fewer parameters than the first set, because the parameters in the second set require less storage space (at rest) or less memory during execution, or a combination of the these. As discussed above with respect to FIG. 4, the virtual conference provider 310 may employ LLM reduction functionality 340 to perform quantization on the parameters' weights of the trained LLM 314, 382. For example, quantization may be used to reduce the precision of one or more weights, such as by converting a floating-point value for a weight into another floating-point value having fewer bits, e.g., by converting a 64-bit floating-point value to a 32-bit or 16-bit floating-point value. In some examples, quantization may be used to convert a floating-point value for a weight into an integer value for the weight that uses fewer bits, e.g., by converting a 64-bit or 32-bit floating-point value into a 16-bit integer. Still other examples of quantization are discussed above with respect to FIG. 4 and may be employed according to various examples.

Further, as discussed above, the LLM reduction functionality 340 may employ distillation to generate a reduced LLM with fewer parameters than in the trained LLM 314, 382. For example, the LLM reduction functionality 340 may select another LLM that has fewer parameters than the trained LLM 314, 382. It may select an LLM from one or more available LLMs based on the number of parameters in the available LLMs or a number of parameters for an intended application for the reduced LLM 342. The selected LLM may have half as many parameters or even fewer than the trained LLM 314, 382. For example, the trained LLM 314, 382 may have 170 billion parameters, while the selected LLM may only have 7 or 10 billion parameters.

At block 730, the virtual conference provider 310 accesses a training data set and the trained LLM 314, 482. In this example, the virtual conference provider 310 accesses a training data set that includes one or more prompts provided to the trained LLM 314, 382 as well as the outputs generated by the trained LLM 314, 382 based on the prompts. In some examples, the training data set may only include one or more prompts that may be provided to the trained LLM 314, 382 to generate an output.

At block 740, the virtual conference provider 310 trains the reduced LLM 342 based on the trained LLM 314, 382 and the training data set. In this example, the virtual conference provider 310 trains the reduced LLM 342 regardless of the LLM reduction functionality 340 employed, whether quantization or distillation. In the case of quantization, this may help fine-tune the reduced LLM 342 that has had some loss of precision during the quantization process. However, it should be appreciated that if quantization is employed, blocks 730 and 740 may be omitted if the reduced LLM's performance is sufficiently high quality without further training.

In the case of distillation, the reduced LLM 342 is trained based on training data to closely replicate the content generated by the trained LLM 314, 382, while using the smaller number of parameters. In each case, training continues as needed until the outputs of the reduced LLM 342 are of sufficient quality.

In some cases, if the LLM reduction functionality 340 employs distillation, a further quantization process may be employed after the reduced LLM 342 has been trained by returning to block 630. This may further reduce the size of the reduced LLM 342 by quantizing some or all of its parameters after the training process has completed. However, after quantization, the training process at block 740 may be repeated to fine-tune the quantized parameters, as discussed above.

At block 750, the virtual conference provider 310 receives a request for the reduced LLM 342 from a client device 330.

At block 760, the virtual conference provider 310 provides the reduced LLM 342 to the client device 330 for use.

While the description above has been in the context of a virtual conference provider 310, it should be appreciated that the method is not limited to virtual conference providers. Instead, any suitable computing device(s) may be employed to perform methods according to this disclosure, including the example method 700 discussed above.

Figure 8:
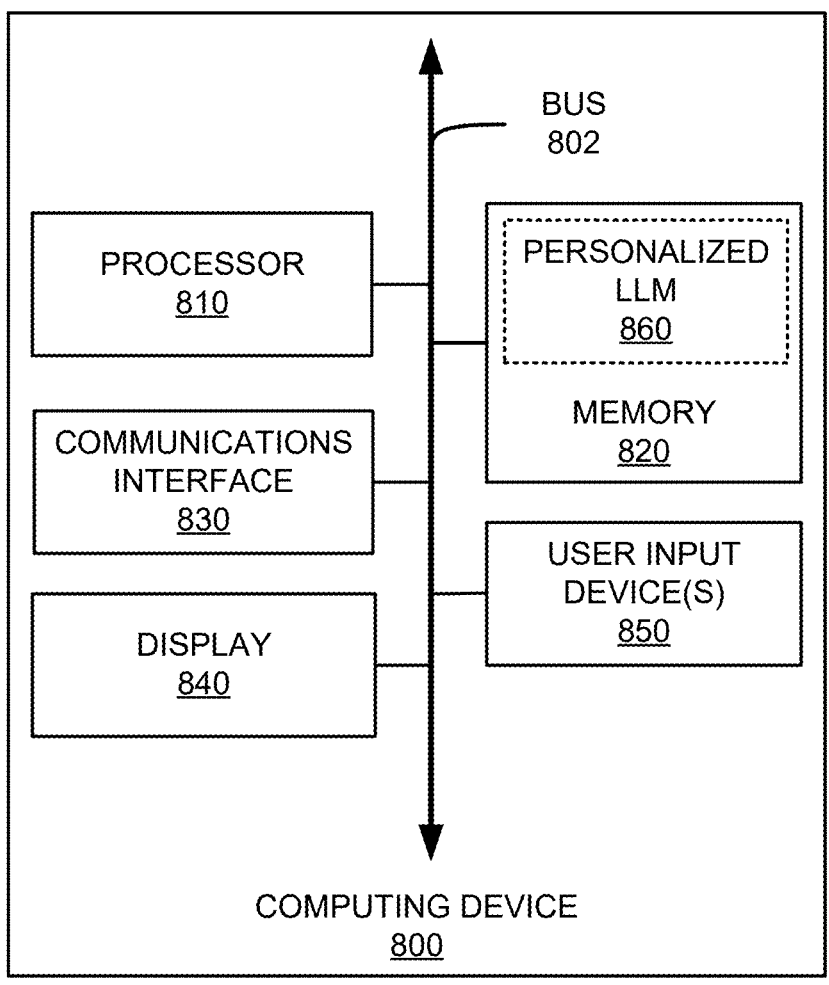
FIG. 8 shows an example computing device suitable for use with systems and methods for portable personalized LLMs.

Referring now to FIG. 8, FIG. 8 shows an example computing device 800 suitable for use in example systems or methods for portable personalized LLMs according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for portable personalized LLMs according to different examples, such as part or all of the example methods described above with respect to FIG. 5. Suitable example computing devices 800, such as user client devices, may also include one or more user input devices 850, such as a keyboard, mouse, touchscreen, microphone, etc., to accept user input. The computing device 800 also includes a display 840 to provide visual output to a user. In addition, the computing device 800 includes one or more portable personalized LLMs 860.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
transmitting, by a client device, a request for a reduced large language model ("LLM") to a remote server;
receiving, by the client device from the remote server, and storing the reduced LLM, the reduced LLM based on a trained general LLM;
training the reduced LLM based on one or more user-generated content items to generate a personalized reduced LLM;
receiving, by the client device, a request to generate content using the personalized reduced LLM;
providing the request to the personalized reduced LLM; and
receiving generated content from the personalized reduced LLM based on the request.

2. The method of claim 1, further comprising:
receiving a request to train the reduced LLM; and
receiving an identification of one or more user-generated content items.

3. The method of claim 2, wherein the personalized reduced LLM is trained based on a selected type of user-generated content items.

4. The method of claim 1, wherein the personalized reduced LLM is trained based on the trained general LLM.

5. The method of claim 1, wherein the trained general LLM has a first set of parameters and the reduced LLM has a second set of parameters, the second set of parameters having fewer parameters than the first set of parameters.

6. The method of claim 1, wherein the trained general LLM has a first set of parameters and the reduced LLM has a second set of parameters, the second set of parameters comprises one or more parameters having different numerical representations than corresponding parameters in the first set of parameters.

7. The method of claim 6, wherein the second set of parameters comprises one or more parameters having a floating-point representation using fewer bits that a floating-point representation of the corresponding parameters in the trained LLM.

8. A system comprising:
a non-transitory computer-readable medium; and
one or more processors configured to execute processor-executable instructions stored in the non-transitory computer-readable medium to:
transmit a request for a reduced large language model ("LLM") to a remote server;
receive, from the remote server, and store a reduced LLM, the reduced LLM based on a trained general LLM;
train the reduced LLM based on one or more user-generated content items to generate a personalized reduced LLM;
receive a request to generate content using the personalized reduced LLM;
provide the request to the personalized reduced LLM; and
receive generated content from the personalized reduced LLM based on the request.

9. The system of claim 8, wherein the one or more processors are configured to execute further processor-executable instructions stored in the non-transitory computer-readable medium to:

receive a request to train the reduced LLM; and receive an identification of one or more user-generated content items.

10. The system of claim 9, wherein the personalized reduced LLM is trained based on a selected type of user-generated content items.

11. The system of claim 8, wherein the personalized reduced LLM is trained based on the trained general LLM.

12. The system of claim 8, wherein the trained general LLM has a first set of parameters and the reduced LLM has a second set of parameters, the second set of parameters having fewer parameters than the first set of parameters.

13. The system of claim 8, wherein the trained general LLM has a first set of parameters and the reduced LLM has a second set of parameters, the second set of parameters comprises one or more parameters having different numerical representations than corresponding parameters in the first set of parameters.

14. The system of claim 13, wherein the second set of parameters comprises one or more parameters having a floating-point representation using fewer bits that a floating-point representation of the corresponding parameters in the trained LLM.

15. A non-transitory computer-readable medium comprising processor-executable instructions configured to cause one or more processors to:

transmit a request for a reduced large language model ("LLM") to a remote server;

receive, from the remote server, and store a reduced LLM, the reduced LLM based on a trained general LLM;

train the reduced LLM based on one or more user-generated content items to generate a personalized reduced LLM;

receive a request to generate content using the personalized reduced LLM;

provide the request to the personalized reduced LLM; and receive generated content from the personalized reduced LLM based on the request.

16. The non-transitory computer-readable medium of claim 15, further comprising processor-executable instructions configured to cause the one or more processors to:

receive a request to train the reduced LLM; and receive an identification of one or more user-generated content items.

17. The non-transitory computer-readable medium of claim 16, wherein the personalized reduced LLM is trained based on a selected type of user-generated content items.

18. The non-transitory computer-readable medium of claim 15, wherein the personalized reduced LLM is trained based on the trained general LLM.

19. The non-transitory computer-readable medium of claim 15, wherein the trained general LLM has a first set of parameters and the reduced LLM has a second set of parameters, the second set of parameters having fewer parameters than the first set of parameters.

20. The non-transitory computer-readable medium of claim 15, wherein the trained general LLM has a first set of parameters and the reduced LLM has a second set of parameters, the second set of parameters comprises one or more parameters having different numerical representations than corresponding parameters in the first set of parameters.

* * * * *